US006230156B1

United States Patent
Hussey (10) Patent No.: US 6,230,156 B1
(45) Date of Patent: May 8, 2001

(54) ELECTRONIC MAIL INTERFACE FOR A NETWORK SERVER

(75) Inventor: Peter Hussey, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/111,432

(22) Filed: Jul. 7, 1998

Related U.S. Application Data (63) Continuation of application No. 08/493,095, filed on Jun. 21, 1995, now Pat. No. 5,826,269.

(51) Int. Cl.[7] .................................................. G06F 17/30
(52) U.S. Cl. ................... 707/10; 705/1; 705/7; 705/8; 705/9; 709/100; 709/102; 709/206; 709/223; 709/224; 707/104
(58) Field of Search ................................. 707/1, 10, 104; 705/9, 1, 7, 8; 709/100, 223, 224, 206, 102

(56) References Cited

U.S. PATENT DOCUMENTS

| 5,442,749 | 8/1995 | Northcutt et al. ............. 395/200.09 |
| 5,452,459 | 9/1995 | Drury et al. ......................... 395/700 |
| 5,504,897 | * 4/1996 | Gans et al. ......................... 707/104 |
| 5,596,745 | 1/1997 | Lai et al. ............................. 395/614 |

(List continued on next page.)

FOREIGN PATENT DOCUMENTS

| 5-81116 | 4/1993 | (JP) . |
| 6-243073 | * 9/1994 | (JP) .............................. G06F/17/00 |

(List continued on next page.)

OTHER PUBLICATIONS

Gordon K. "Data Warehouse processing and query by mail", ACM, vol .27 No. 1, pp. 39–44, 09/96.*
Ravi et al, "An E–mail based bibliographic information server", Journal of information, vol. 20, No. 4, pp. 295–299, 01/94.*
Haskin David, "E–mail connection 2.0 speeds up and Smoothes out", PC Magazine, vol. 13, No. 10, pp. 54(1), May 31,1994.*
Microsoft "Electronic Mail for PC Networks" Microsoft Mail, © 1992.
Microsoft "Windows for Workgroups Resource Kit," © 1992.

(List continued on next page.)

*Primary Examiner*—Hosain T. Alam
*Assistant Examiner*—Jean M. Corrielus
(74) *Attorney, Agent, or Firm*—Leydig, Voit & Mayer Ltd.

(57) ABSTRACT

A networked system for processing queries for a server in a distributed processing environment is provided. The system includes a plurality of clients disposed for communication with a database server through an electronic mail system. The server includes an electronic mail interface for receiving queries submitted by the clients and for transmitting the corresponding responses. A mail processor is also provided for processing the queries submitted by the clients and for submitting the queries to the request processor. The mail processor operates to provide bi-directional communication between the mail interface and the request processor. In addition, the mail processor retrieves mail messages from the mail interface, translates them into a format recognized by the request processor, receives query results from the request processor, and returns the results with the appropriate user identification to the mail interface. A scheduler, provided in connection with the server, provides automated scheduled execution of the mail processor in accordance with a set of programmed tasks.

12 Claims, 6 Drawing Sheets

U.S. PATENT DOCUMENTS

| | | | | |
|---|---|---|---|---|
| 5,606,684 | | 2/1997 | Nakano et al. .................... | 395/441 |
| 5,619,648 | * | 4/1997 | Canale et al. ...................... | 709/206 |
| 5,659,692 | | 8/1997 | Poggio et al. ..................... | 395/330 |
| 5,777,549 | * | 7/1998 | Arrowsmith et al. ............. | 340/506 |
| 5,805,811 | * | 9/1998 | Pratt et al. ........................ | 709/206 |
| 5,835,762 | * | 11/1998 | Gans et al. ........................ | 709/100 |
| 5,899,979 | * | 5/1999 | Miller et al. ...................... | 705/9 |

FOREIGN PATENT DOCUMENTS

| | | | | |
|---|---|---|---|---|
| 7-038602 | * | 2/1995 | (JP) .............................. | G06F/13/00 |
| 7-141439 | * | 6/1995 | (JP) .............................. | G06F/17/60 |

OTHER PUBLICATIONS

Allard et al., "Windows NT and the Internet," pp. 1–9, 1994.

Debra Niedermiller–Chaffins, Inside Novell NetWare, Special Edition, pp. 338–343, © 1992.

Microsoft Schedule + Version 7.0a, © 1992–1996 Microsoft Corporation, (Actual Screen dump of Schedule + program).

Comer, "A Guide to RFCs," in *Internetworking With TCP/IP*, vol. 1, $2^{nd}$ ed., © 1991.

* cited by examiner

EMAIL MESSAGE FORMAT

FIG. 3

| PROPERTY NAME | R/W | DESCRIPTION |
|---|---|---|
| SchedulerName | RO | Scheduler who owns this task |
| ID | RO | Task identifier |
| Owner | RO | login ID of owner |
| Name | RW | Task label |
| Status | RW | Active (can be invoked by scheduled) or Inactive (ignored by scheduler) |
| Server | RW | Server to invoke this task on |
| Database | RW | Database to invoke this task on |
| User | RW | SQL Server user ID for invoking task |
| SubSystem | RW | SubSystem which the task is invoked on:<br>REP - Replication<br>VBA - Visual Basic<br>SQL - SQL Script<br>NT - NT command shell<br>Plus additional ones defined in *TaskType* |
| FequencyType | RW | One-time - start date/start time<br>Recurring - see frequency<br>On-demand - invoked manually (usually by an alert) |
| Frequeny | RW | Daily, Weekly, Monthly, Hourly, every "x" minutes, etc. |
| ActiveStartDate | RW | Beginning date at which this task is active |
| ActiveEndDate | RW | Last date this task is considered active |
| ActiveStartTimeOfDay | RW | Time window beggining for scheduling task |
| Active EndTimeOfDay | RW | Time window end for scheduling task |
| TaskPriority | RW | NT priority for this task<br>(always equal to, or less than, SQL Server) |
| LastRunDate | RW | Last time this task was invoked |
| LastRunStatus | RW | Last status of this task (Success/Fail)<br>(used to indicate if retry is necessary) |
| LogToHistory | RW | upon Success, Failure or Both |
| EmailUponCompletion | RW | Completion for Email notification: Success/Failed/Both |
| AdminEmail | RW | Email address for notifications |
| RetryAttempts | RW | Number of retries to attempt for this task |
| RetryDelay | RW | Delay time (in minutes) between retries |
| RetriesAttempted | RO | total retries attempted so far |
| DateCreated | RO | Create date |
| DateModified | RO | Last modification Date |
| Command | RW | command to be executed - varchar (255) |
| TaskHistory collection | | list of all occurrences for this task |

TASK RECORD

EMAIL INTERFACE PROCESS

EMAIL MESSAGE PROCESSING

ELECTRONIC MAIL INTERFACE FOR A NETWORK SERVER

This is a continuation of application Ser. No. 08/493,095 filed on Jun. 21, 1995 U.S. Pat. No. 5,826,269.

BACKGROUND OF THE INVENTION

1. Field of the Invention

The present invention relates generally to networked systems, and more particularly, to the processing by a server of requests from a plurality of communicatively coupled computing machines in a network environment.

2. Discussion of the Related Art

Generally speaking, computer networks include a plurality of communicatively interconnected computing machines (e.g., terminals, micro-computers, mainframe, etc.). Networks seek to better utilize computer resources (e.g., memory, hard disks, printers, processors, files, programs, and processing capabilities) by enabling the constituent computing machines to share the computer resources.

Sharing computer resources in a network enables a requesting computing machine, also referred to as a client, to submit a request for an operation to be performed on another networked computer, referred to as a server. Servers include, for example, database servers, file servers, and print servers, and respond to requests by clients for the associated resources provided by the servers. The server processes the request and provides an appropriate response informing the requesting client of the results. Instances in which such an arrangement is particularly beneficial exist where a large database is utilized by a number of users or where a set of users require access to a same set of information within a dynamic database. In such cases, well known benefits are realized by the sharing, via a database server, of access by users to the information and the operations performed by the database server upon the information such as, for example, performing searches of the database in response to requests submitted by the networked users.

In a typical client/server based network, a number of diverse clients are communicatively coupled to one or more servers in order to facilitate the submission of a variety of requests to the servers. A particular type of network server is a database server. Database servers maintain and manage a shared database in a network. By sharing the database, it is possible for the database server to maintain a single master copy of the database. Networked client computers send requests to the database server to add additional records to the database, remove records from the database, and update records in the database. In addition, the clients submit database queries to the database server concerning the information records stored in the database controlled by the database server.

Even with a database server dedicated essentially to responding to database requests, when a number of users submit queries to the server in a very short time period or the database server is processing a very large, non-interruptable task, a system bottleneck arises. Consider, for example, a business accounting system having a centralized database maintained and managed by a database server communicatively coupled to a number of client machines set up for use by accounting personnel. Assume that the accounting database includes various income and expense accounts. Associated with each account are a number of transaction dates, amounts, comments, etc. A number of accounting personnel may submit substantially simultaneous query requests to the database server. The database server, in response to the simultaneous requests, allocates its processing resources to process the query requests as quickly as possible, while avoiding errors resulting from a query to a partially updated database.

In general, there are various response time requirements for execution of database queries by a server. A client machine may submit a high priority query needing immediate attention. On the other hand, another client machine may submit a low priority request that may be responded to by the database server at a later time when higher priority queries are not pending.

Continuing with the foregoing example of a database server maintaining account information, a user may submit a high priority request via a network client requiring immediate attention by the server such as, for example, a particular account balance query requiring an expedited response from the server. The client maintains a connection to the server until the client receives a response to the request from the server. In other instances, a user may not need an immediate response. For example, a user logged onto a network client may need a set of the previous day's balances for a designated set of accounts at the beginning of the following business day. Such a request would typically be considered a low-priority request.

In order to avoid tying up network resources such as database servers during high usage periods, known systems include means for delaying carrying out low priority requests from clients. In such systems, the user submits a low priority request, for example, during the previous business day. The request is processed in due course by the database server during a low-usage time (e.g., after business hours). The requesting client, rather than maintaining a connection to the server in order to receive an immediate response, typically terminates a network connection after transmitting the request. The requesting client receives the results at a later time after re-establishing a connection to a network entity containing the results of the request, or by receiving the results in printed form.

In a known system, a client submits a request to a connected server and then disconnects before receiving a response from the server. After processing the request, the server transmits the results to an electronic mail (email) location designated in the request. Thereafter, the client retrieves the results of the requests from the electronic mail location.

While submitting requests that direct the output to be mailed back to the client does, in effect, enable a client to "disconnect" between submitting a query and retrieving the results, it is inefficient from a design perspective, since it requires supporting, by the client machines, two separate and architecturally distinct interfaces to accomplish a single task. A client machine, in order to utilize such a system must support an on-line connection to the server for submitting a request and a separate email interface for reading the results. Furthermore, the presence of two different interfaces may require a user to learn how to use two separate software tools (e.g., an on-line server query tool to submit a request to the server, and another tool to interface with the emailed results). Alternatively, additional integration software (e.g., a user shell) can be designed to accommodate both interfaces in a manner that is transparent to the user. However, there are clearly implementation costs and complexities that arise from the existence of this hybrid client/server interface.

Yet another approach to enabling a user to initiate a request to a server and disconnect before receiving the results involves the use of "detached processes." Detached processes are essentially programs that receive requests from users on client machines that are eventually to be submitted to a server. The detached processes may, in turn, impersonate the users while submitting the received requests to the server and obtaining the results. The user, at some later time, obtains the results of the request through yet another procedure such as establishing a connection with the detached process in order to obtain the results of the request. It is noted that, the detached processes are constrained by the same request/response protocols of the clients. For example, the detached processes will likely maintain a continuous connection to the server while the server processes the request.

The detached process approach, while providing a number of well known advantages over direct on-line connections to servers, has certain drawbacks. Since the detached process runs separately from the database server (either on the same machine or on a separate machine), there are processing, memory, and possibly network costs associated with sending the requests and results between the detached process and the database server. In addition, the detached process adds a separate element to the total system that must be monitored so that the detached process is always running and available to handle requests. Furthermore, the use of a detached process introduces yet another communication link in a network that must, in a secure network, be guarded. Thus, detached processes add complexity and administrative costs to the total system which, in some cases, are too prohibitive to justify implementation or use.

SUMMARY OF THE INVENTION

Accordingly, it is an object of the present invention to provide an efficient networked system that processes user requests submitted to a network server, the results of which are typically viewed at a later time.

Another object of the present invention is to provide a flexible client/server interface in a networked system enabling a wide variety of users to take advantage of the shared resources administered by the server.

Another more specific object of the present invention is to provide a non-online client/server interface that provides a level of resource security equivalent to on-line interfaces.

Another object of the present invention is to facilitate task scheduling by the server of user requests from connected client computers in a network, and thereby reduce the incidence of system bottlenecks that may arise with a server.

Yet another object of the present invention is to simplify the user interface and implementation costs associated with providing a variety of methods for initiating, processing, and obtaining the results of a request from a client to a server.

Additional objects, advantages and other novel features of the invention particularly pointed out in the appended claims will be apparent to those skilled in the art in view of the description that follows.

The above described objects are met in a networked system enabling clients to submit requests to a server via electronic mail. The system includes a client having an electronic mail interface for submitting a request to the server. The client initially submits the request to an email address in an email system. The email address corresponds to an electronic mailbox designated for the server.

An electronic mail interface in the server retrieves the request from the electronic mailbox. After the request is retrieved, an email processor interprets the contents of the request retrieved by the email interface, and submits an appropriate command request to a server request processor based upon the request.

In accordance with an illustrative embodiment of the present invention, a task scheduler periodically invokes the email processor to process the retrieved electronic mail messages from clients and submit appropriate command requests to the server request processor. After the server request processor generates a response to the command request, the email processor builds a response electronic mail message, including the response to the command request, based upon information contained in a header for the email request. Finally, the email interface transmits the response via email addressed to an electronic mailbox designated for the user that initiated the request.

Furthermore, in accordance with an illustrative embodiment of the present invention, the server is a database server and the email request comprises a database command. In the illustrative embodiment of the invention the database command comprises a database query in the form of a Structured Query Language (SQL) statement or stored procedure call.

BRIEF DESCRIPTION OF THE DRAWINGS

FIG. 4 shows the fields of a scheduler task record and a corresponding summary of the fields;

DETAILED DESCRIPTION OF THE DRAWINGS

Figure 1:
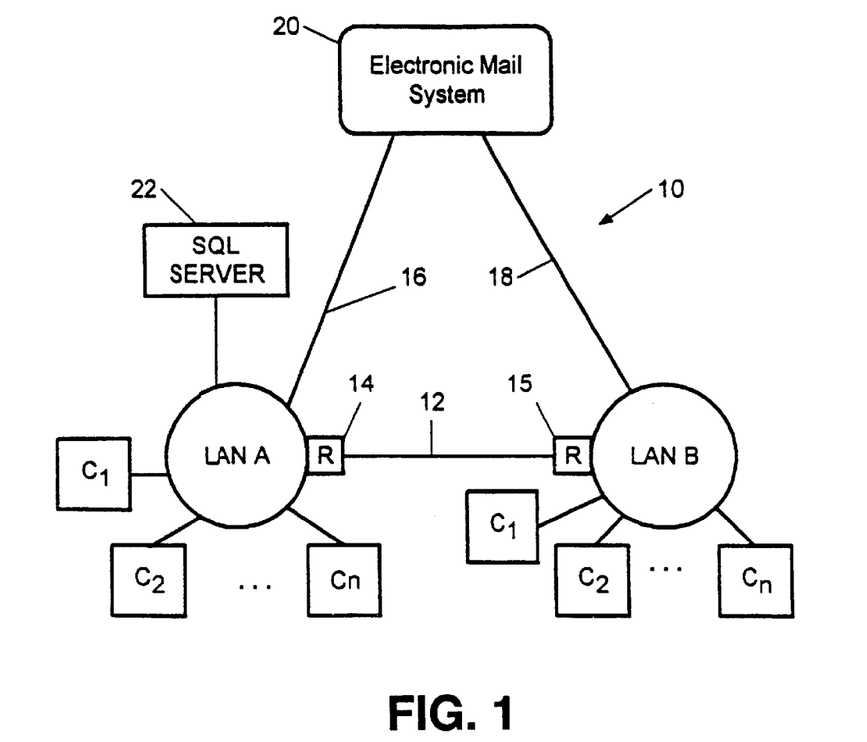
FIG. 1 is a block diagram depicting an illustrative example of a network suitable for incorporating the present invention.

Referring now to the figures, FIG. 1 schematically depicts an illustrative distributed processing network 10. The network 10 includes two local area networks (LANs), LAN A and LAN B. Each of these LANs includes a plurality of network client computers $C_1$–$C_n$. LAN A and LAN B are communicatively interconnected by a wide area network (WAN) link 12, and static routers 14 and 15 facilitate inter-network transfers of messages in a known manner between LAN A and LAN B.

WAN links 16 and 18 communicatively link LAN A and LAN B to an electronic mail (email) system 20. The email system 20 enables users to send and receive messages via electronic files stored and maintained on the email system 20. More particularly, message packets may be sent and retrieved by various clients $C_1$–$C_n$ as well by a Structured Query Language (SQL) server 22.

The SQL server 22, in accordance with an illustrative embodiment of the present invention is a network server that is configured to respond to SQL commands received from communicatively coupled client computers. It will be appreciated by those skilled in the art that the clients $C_1$–$C_n$ of LAN B may communicate with the SQL server 22 through the static routers 14 and 15 and the WAN link 12. In accordance with the present invention, the SQL server 22 also maintains an account on the email system 20 referenced by an electronic mailbox address. Thus, the clients on both LAN A and LAN B may alternatively communicate with the SQL server 22 via the email system 20.

Indeed, through the instrumentalities of the illustrative embodiment of the present invention, clients submit queries to the SQL server 22 via the email system 20 The SQL server 22 periodically retrieves these queries from the email system 20 for processing. Once the queries are processed, the SQL server 22 transmits the results back to the email system 20, where they may be retrieved by the clients at a later time.

It should be noted that, for purposes of the preferred embodiment, the SQL server 22 refers to a server executing a particular software package by Microsoft® Corp. The Microsoft SQL Server is a multi-user database management service which allows a wide range of client applications and tools to share information safely, securely and effectively. Indeed the Microsoft SQL Server is supported by a number of front-end tools including spreadsheets, databases, development tools, and languages. However, consistent with the broader concepts and teachings of the present invention, the SQL server 22 is a specific example of a server that supports and executes requests submitted via electronic mail from the client computers. It is further noted that the present invention is applicable to a wide variety of alternative network topologies. In one such alternative network topology, the email system 20 and the SQL server 22 reside on the same LAN.

Figure 2:
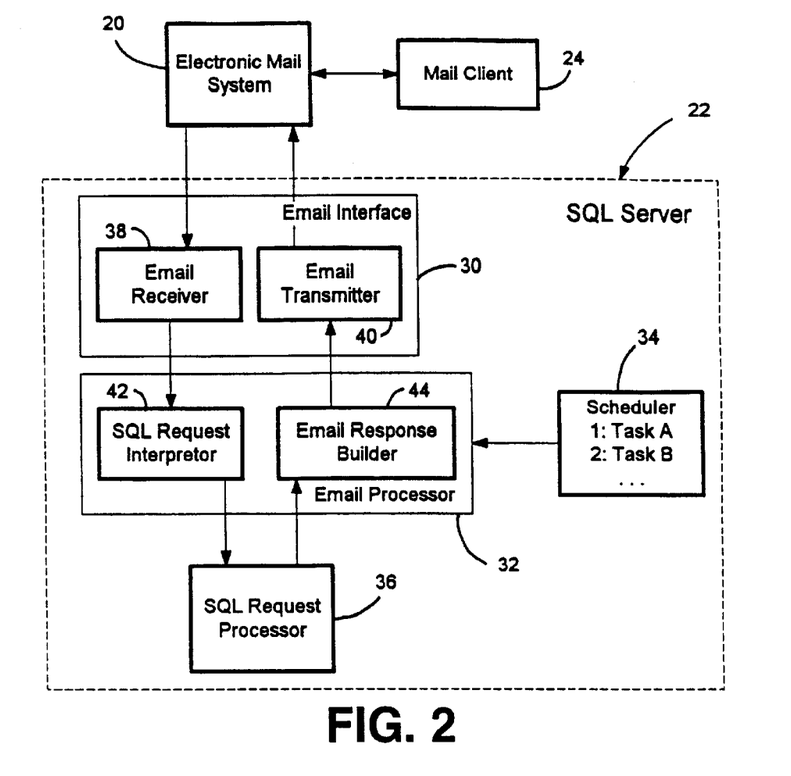
FIG. 2 is a block diagram showing the functional partition of a database server and supporting interface components in an illustrative embodiment of the present invention.

Continuing with the description of the illustrated embodiment, reference will now be made to FIG. 2, which shows a functional partition of the SQL Server 22 and supporting components. The various discrete blocks in FIG. 2 reflect functional partitions accomplished by software implementation on actual computer hardware systems, rather than hardware partitions. Indeed, while it is typically true that the mail client 24, the electronic mail system 20, and the SQL server 22 are distinct hardware components in a network, these functional units may correspond to processes running on the same physical hardware component. For example, a single machine may support both the mail system 20 and the SQL server 22.

A mail client 24 on a client computer is disposed for communication with the email system 20. The mail client 24 refers to that portion of a client process communicating with the mail system 20, and is specifically denoted as the mail client 24 for purposes of illustration, since the present invention generally concerns client-mail communication. Indeed, it is understood that a typical client possesses the capability to directly communicate with the SQL server 22 (for example, by way of LAN A) and to communicate with the email system 20. Direct communication with the server 22 is known and therefore is not specifically illustrated in the figures nor discussed herein.

Similarly, the email system 20 is of conventional design and therefore will not be described in detail in view of the knowledge of those skilled in the art. The email system 20 usually is present in the form of a distinct network server. Electronic mail messages are organized in a standardized format, or packet structure. Discrete components of this packet structure include a header comprising a source identification, a destination identification, date/time of transmission, subject, recipients of copies, as well as other known control and status information components. Appended to the packet is the mail message itself. In accordance with the illustrative embodiment of the invention, the mail message is an SQL server query which, as will be described in more detail below, is interpreted and processed by the SQL server 22. However, the mail message may also comprise a record to be added to the SQL database or a request to delete or update a particular record in the database.

While the communication format and standards for the email system 20 are known and understood, it is significant to note that the present invention's utilization of the email system 20 realizes certain benefits, including system fault tolerance. For example, a break or disruption in a network link will not result in lost data. Instead, the information will merely be stored until the fault is repaired. In addition, an SQL client on a remote LAN can be configured to attempt to submit an SQL request to the SQL server 22 via the email system 20 when a WAN link connection becomes disrupted, or otherwise unavailable. An additional benefit includes a single type of interface (email) for transmitting requests and responses between a client and the SQL server 22.

The email system 20 is illustrated in communication with the SQL server 22. The principal components of the SQL server 22 include an email interface 30, an email processor 32, and a scheduler 34 that invokes a set of tasks performed by the email processor 32. The SQL server 22 also includes an SQL Request processor 36 of known design. These principal components of the SQL server 22 cooperate to retrieve email messages addressed to the SQL server 22 in the email system 20, process the received email messages periodically under the control of the scheduler 34, and if required, build appropriate email messages containing the results of processed requests and issue them to the email system 20.

The email interface 30 is configured, for example by an administrator of the SQL server 22, to periodically logon to the email system 20 in order to check the electronic mail box of the SQL server 22. While logged onto the email system 20, an email receiver 38 reads all of the email messages currently stored in the email account for the SQL server 22. The email receiver 38 stores all of the previously unread messages in a received email message queue, also referred to as a mail "inbox" (not shown) in the SQL Server 22 for later access by the email processor 32. The mail "inbox" typically resides on a hard disk storage device associated with the SQL server 22.

Figure 6:
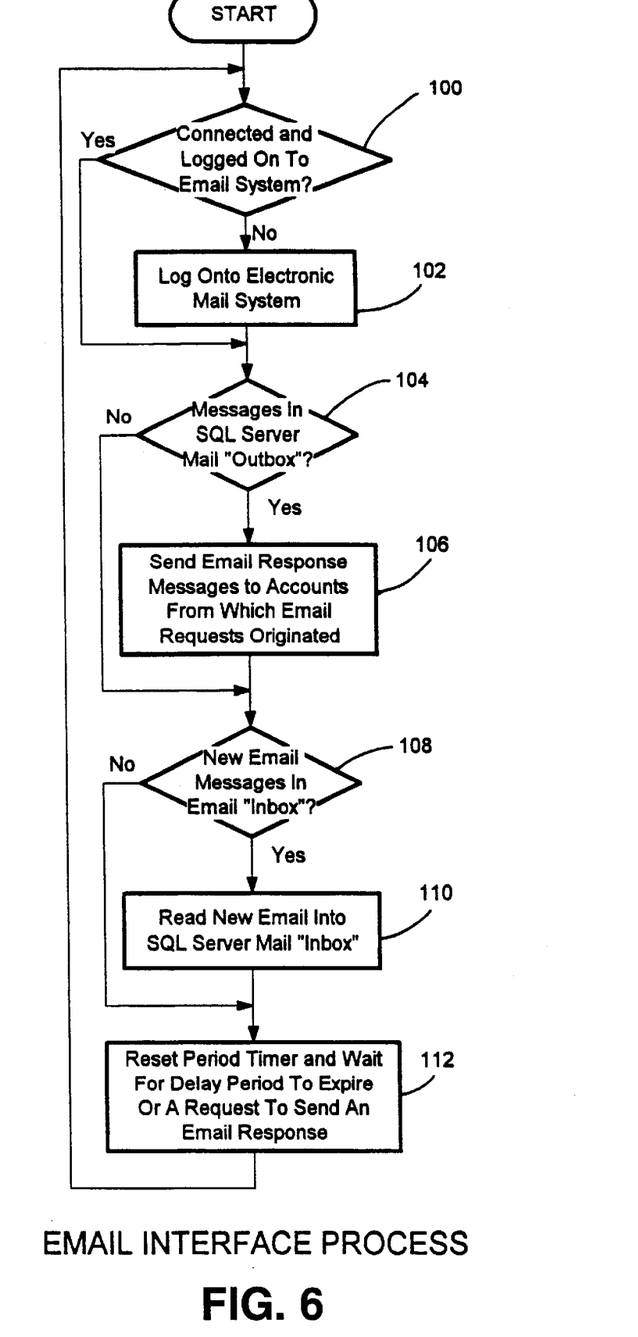
FIG. 6 is a flowchart summarizing the steps executed by the electronic mail interface shown in the functional block diagram of FIG. 2.

While logged onto the email system, the email interface 30 also determines whether any email response messages are present in an email transmit message queue, also referred to as a mail "outbox" (not shown) in the SQL server 22. The mail "outbox" typically resides on the hard disk storage device of the SQL Server 22. If the mail outbox is not empty, then the email transmitter 40 of the email interface sends the email messages in the mail outbox to the email system 20. The operation of the email interface is illustrated in FIG. 6 described below.

The above described email receive and send operations are carried out in accordance with known email protocols prescribed by the email system 20. In the illustrative embodiment of the present invention, the mail interface 30 supports the well known Messaging Application Programming Interface (MAPI). However, other mail interfaces may be used in accordance with alternative embodiments of the invention as long as the ability is maintained for the SQL server 22 to receive email messages.

Database servers, such as the SQL server 22 generally do not have the capability to make direct calls to an email interface 30. However, the SQL server 22 includes a known mechanism for invoking external functions implemented according to a defined format called "extended stored procedures". The email processor 32 thus includes a stored procedure that invokes a set of extended stored procedures that provide an interface to bridge the operational gap between the SQL request processor 36 and the email interface 30. In this regard, the email processor 32 comprises a dynamic link library (DLL) of extended stored procedures for facilitating finding a next message stored in the mail "inbox" of the SQL server 22, reading the message, interpreting the message (by means of an SQL request interpreter 42) in order to convert the message into a proper SQL request format, and submitting the interpreted request to the SQL request processor 36 in the SQL request format. The email processor 32 also includes a function for deleting the message from the mail "inbox" after submitting the request to the SQL request processor 36. However, in an alternative embodiment of the present invention, the email processor 32 does not delete an email message if the email message designates that it should not be deleted. Such an arrangement facilitates the periodic execution of the same request without a user having to re-submit the request.

The email processor 32 also receives responses from the SQL request processor 36 corresponding to previously submitted SQL requests. After receiving a response, an email response builder 44 formulates an email response message. The receiver of the email response is designated based upon the identity of the user identified in the sender field of the email request to which the SQL response corresponds. In addition, "cc:" copies are designated in the email response message based upon the contents of the "cc:" field in the email request. In addition, the message may include an attached file which is designated in the response email via an option in the interface to the email transmitter 40. The email generally sends SQL query results as an attached file in a well-known format such as a spreadsheet or ASCII text. The well-known formats allow the mail client 24 to view the query results using standard application software such as a spreadsheet program or text editor.

After building the email response message, the email processor 32 via an invoked extended stored procedure, places the email message in the mail "outbox" associated with the email transmitter 40. The email transmitter 40 sends email responses stored in the mail "outbox" to the electronic mailboxes within the email system 20 corresponding to the users that originally submitted the SQL requests via email as well as any valid cc'd users.

As previously explained, the email interface 30 performs its logon and email read and send operations on a periodic basis. In the illustrative embodiment of the present invention, the email processor 32 is provided with such capabilities as well, and indeed, these scheduling capabilities are expanded to include the capability of performing email request message filtering on the received email messages residing in the mail inbox of the SQL server 22. This capability is facilitated by the scheduler 34 that governs not only when email SQL requests in the mail "inbox" are processed, but also which requests will be processed and how their results will be formatted in corresponding email responses. For example, the Scheduler 34 may invoke a task every 10 minutes to specifically search for email messages including "SQL: spreadsheet" in their "subject" field (explained below), and return results for such requests in a "spreadsheet" format.

Generally, the Scheduler 34 invokes a set of tasks (described below in conjunction with FIG. 4) programmed by an administrator of the SQL Server 22 for processing the received email in the mail "inbox" of the SQL server 22 on a scheduled basis. In the illustrative embodiment of the invention, the administrator designates, for each task in the task list, whether a task will be executed just once, on demand, or periodically. If the task is executed periodically, then the administrator also programs a frequency at which the task is invoked. Examples of frequencies include monthly, weekly, daily, hourly, or every "x" minutes.

The programmed tasks of the Scheduler 34 also include a "start time" and an "end time". The start tire designates when the task is invoked for the first time in a given day, and the end time designates when the task will be disabled. The programmed tasks also include a "start date" and "end date". These task descriptors identify the date when the task will first be invoked and the date in which the task will be inactivated. The task will however remain in the task list of the Scheduler 34 in its disabled state.

Figure 3:
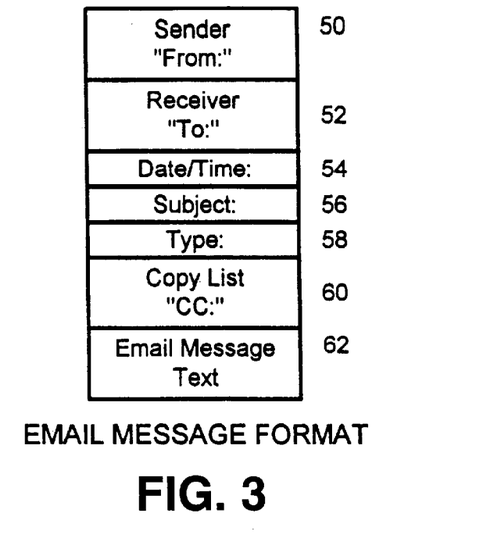
FIG. 3 is a diagram showing the record fields for an illustrative email message.

Turning now to FIG. 3, a set of fields are schematically depicted that are included in an email message for use in conjunction with the present invention. In particular, the illustrative email message includes a sender field 50 designating the email account from which the email SQL request originates. As previously mentioned, the email processor 32 saves this value when processing an email request message from the mail "inbox" in order to later designate a proper receiver for the SQL server response. In a secure server environment, the SQL server may incorporate security procedures that use the contents of the sender field 50 to determine, using an appropriate verification mechanism, whether the identified sender is authorized to submit the SQL request. Such security mechanisms would be known to those skilled in the art.

The email messages also include a receiver field 52. In the context of the present invention, the receiver field of messages contained in the mail "inbox" contains the account name for the SQL Server 22. In alternative embodiments of the present invention, the SQL Server 22 may support a plurality of account names associated with various functions and services provided by the SQL Server 22. The receiver field 52 in a response email message from the SQL Server 22 is filled with the account name of the user that originally submitted an email SQL request to the SQL server 22.

The email messages also include a standard Date/Time field 54 identifying when an email message was sent to the electronic mailbox of the identified receiver in the email system 20. Such a field can be utilized by the SQL Server 22 to identify "stale" email requests in the mail "inbox".

A subject field 56 is a standard email message field utilized by senders of email to identify the general subject matter to which the email message pertains. However, in the illustrative embodiment of the present invention, the subject field is utilized in conjunction with "filters" associated with specialized tasks invoked by the scheduler 34 (described above) in order to process the email request in a specific manner. The users of the email interface for submitting SQL requests to the SQL server 22 follow a "filtering" standard designated by the administrator in charge of programming the tasks invoked by the scheduler 34. As a result, the users designate processing of their email SQL requests by the SQL server 22 in a certain manner by simply entering a proper sequence of characters in the subject field 56 of an email SQL request.

For example, a user might wish to receive the results of an email SQL request in the form of an attached spreadsheet file suitable for use with EXCEL (Trademark Microsoft Corporation). In this case, the user submits an email request and includes the text: "SQL: spreadsheet" in the subject field 56. A programmed task invoked by the scheduler 34 having a filter corresponding to the "SQL: spreadsheet" character string identifies the SQL request in the mail "inbox", processes the SQL request, and returns a response in the EXCEL spreadsheet format. Another example is a user requesting to receive results simply as a text file within the mail message itself. In this case, the subject field 56 would read "SQL: text".

Of course, a wide variety of filters and resulting specialized processing of email SQL requests designating the filters is possible, and is generally only limited by the processing capabilities of the SQL server 22. In addition, while it is often easiest to designate the "filters" in the subject field 56, this information may alternatively be provided in an email message type field 58. Under this approach, the email processor 32, in accordance with the filtering criterion specified by an invoked task, searches the email message type field 58 of email messages in the mail "inbox" in order to apply the filtering criterion. Filters on the sender field 50 and the email message text field 62 are also possible in alternative implementations.

In the illustrative embodiment, a copy list field 60 of an email message is utilized by the SQL server 22 to distribute copies of the response to the email SQL request via a known "cc:" designation code in the email response to the sender of the email SQL request. As a result, any account that was provided the email SQL request (via the "cc:" email command) will also receive a copy of the email response submitted by the SQL server 22 to the email system 20.

Finally, an email message text field 62 includes an actual SQL command set forth in a manner usually designated by on-line users of the SQL Server 22. In the illustrative embodiment, the SQL command may consist of a SELECT statement that returns a query result set. Additionally, the SQL command may comprise an INSERT, an UPDATE, or a DELETE command in order to modify certain information within a database. The SQL command may also comprise a request to execute an identified stored procedure for performing a combination of data retrieval, manipulation, and modification steps.

Figure 5:
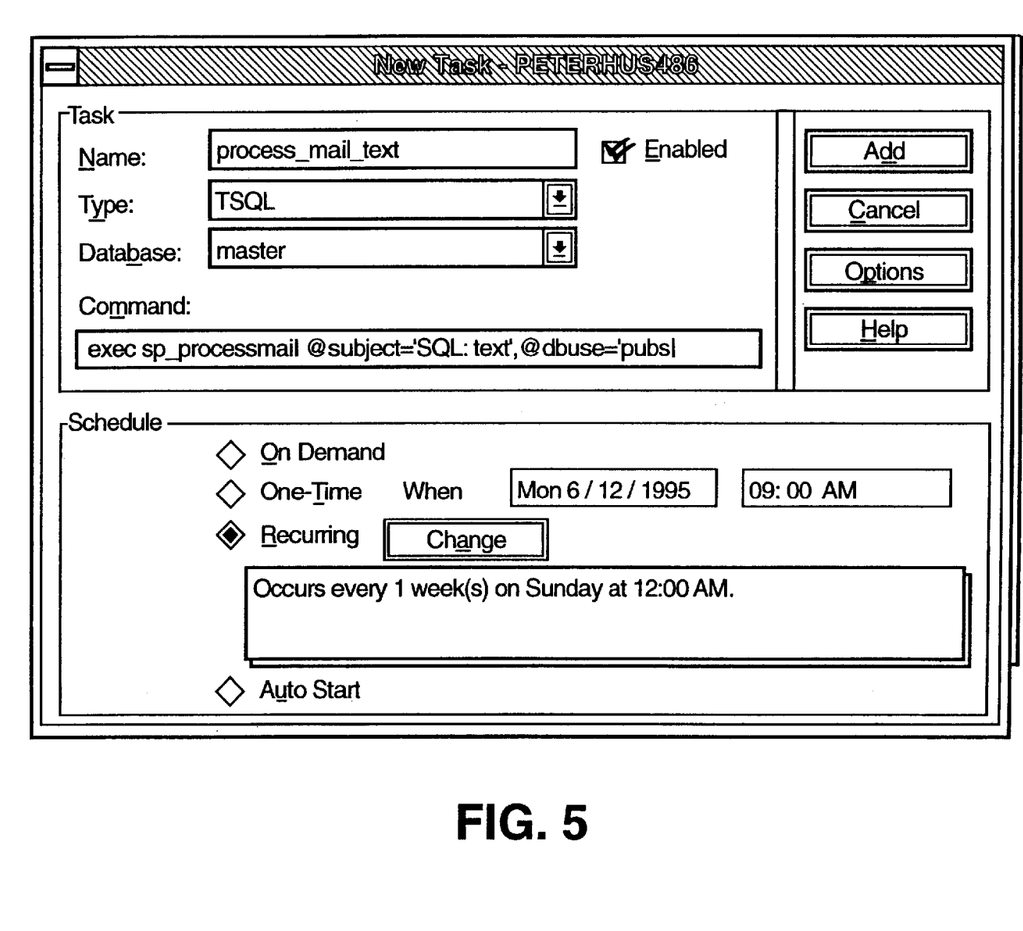
FIG. 5 is an illustrative example of an interface for use by an administrator to program tasks invoked by a task scheduler.

Having described the primary fields of an email message and their function in the illustrative embodiment: of the present invention, attention is now directed to FIG. 4 comprising fields included in a task record. As explained above, each task is separately invoked by the scheduler 34 to traverse and selectively process the set of email SQL requests stored in the mail "inbox" of the SQL server 22. A number of the fields have been described above and therefore will not be discussed here in view of the descriptions that accompany the listed fields. It is further noted that the "command field" stores the "processmail", command issued by the scheduler 34 commencing execution of the task by the email processor 32. In addition, the filter values, also stored in the command field, are passed as parameters associated with the processmail command. In addition, an exemplary administrator interface is provided in FIG. 5 for defining tasks in accordance with the illustrative embodiment of the present invention.

Figure 7:
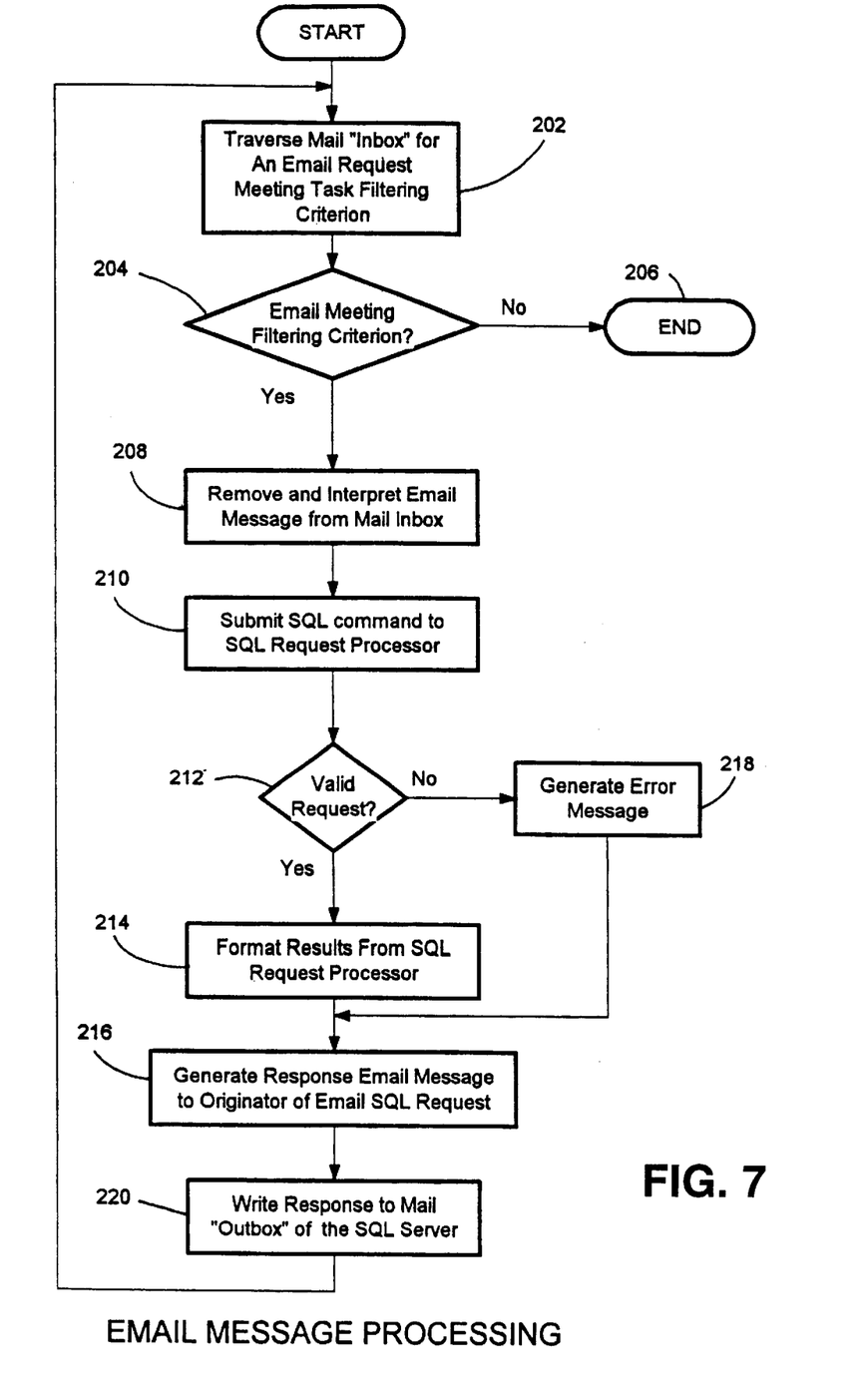
FIG. 7 is a flowchart summarizing the steps executed by the electronic mail processor shown in the block diagram of FIG. 2.

Reference is now made to the flowcharts in FIG. 6 and FIG. 7 respectively summarizing the steps comprising the principle operation of the email interface 30 and the email processor 32. The email interface 30 periodically checks the electronic mail box assigned to the SQL server 22 in the electronic mail system 20 for received SQL requests and sends completed responses from the SQL server 22 to designated recipients in the email system 20. The email processor 32 retrieves email messages placed by the email interface into the mail "inbox" of the SQL server 22, initiates the processing of SQL commands embedded within the email messages, and returns response messages to the mail "outbox" of the SQL server 22.

Turning now to FIG. 6, it is noted that in the preferred embodiment of the invention, the SQL server 22 maintains a constant connection with the email system 20 Therefore, after initially logging onto the email system 20, the SQL server 22 only re-establishes a connection and logs onto the email system if the connection is interrupted. In other embodiments of the invention, however, if the cost of maintaining a constant connection to the email system 20 is expensive, then additional procedures may be implemented for terminating the connection between the SQL server 22 and the email system 20 during periods of low usage.

At step 100 if the email interface 30 determines that the SQL server 22 is not connected and logged onto the email system 20, then control passes to step 102 wherein the email interface 30 establishes a connection and logs onto the email system 20. Otherwise, if the SQL server 22 is currently connected and logged onto the email system 20, then control passes directly to step 104.

At step 104, the email interface 30 checks the mail "outbox" that serves as the depository of SQL results which have been converted by the email processor 32 into email response files. If email response files are stored in the mail "outbox" of the SQL server 22, then control passes to step 106. Each email response file, in addition to having an appropriately formatted response message, contains designated recipients including the originator of the request as well as any appropriate additional recipients designated in the "cc:" field 60 of the original email SQL request. Each email response file also includes text for insertion into the subject field of the email. At step 106, the email interface 30 transmits the email response files containing the responses by the SQL server 22 to the accounts of the designated recipients. After the email transmitter 40 of the email interface 30 has transmitted all of the mail messages contained in the mail "outbox", control passes to step 108. If no messages were found stored in the mail "outbox" during step 104, then control passes directly to step 108.

At step 108, if the SQL server 22 has received new email, then control passes to step 110. At step 110, the email receiver 38 reads the new email into the mail "inbox" of the SQL server 22, and control passes to step 112. However, at step 108 if there is no new email in the SQL server 22's electronic mailbox, then control passes directly to step 112.

The email interface 30 is programmed to execute the steps summarized in FIG. 6 in a continuous loop on a delayed basis. Therefore, at step 112 the email interface 30 resets a delay period timer for returning to step 100 when a programmed time interval has elapsed since the email interface 30 last logged onto the email system 20. This delay period, may, however, be interrupted by a request to send an email result generated by the email processor 32 and placed in the mail "outbox" of the SQL server 22.

FIG. 7 illustratively depicts the steps performed by the email processor 32 in accordance with a processing criterion provided by a task invoked by the scheduler 34. In particular, at step 202, in response to receiving a task description, the email processor 32 traverses the set of received email SQL requests in the mail "inbox" of the SQL server 22 in search of an email request having a subject field 56 meeting a filtering criterion associated with the task. The search continues at step 202 until the email processor 32 either identifies an email request meeting the filtering criterion, or the email processor 32 reaches the end of the list of email requests stored in the mail inbox. Control then passes to step 204.

At step 204, if there are no unprocessed email messages in the mail "inbox" of the SQL server 22 meeting the task's filtering criterion, then control passes to an End step 206 wherein the task is terminated after information concerning the results of the invoked task have been recorded for review by the SQL server 22 administrator.

However, at step 204 if an email SQL request meeting the filtering criterion is identified, then control passes to step 208. At step 208, the email processor 32 removes the identified email SQL request message from the mail inbox, and extracts information from the email message comprising the SQL command that is to be passed on to the SQL request processor 36. Generally the entire message text is passed on to the SQL request processor 36, but it is also envisioned that in some instances, the email processor 32 will perform pre-processing of the message text. For example, some email systems insert message routing information at the beginning of the message text. The email processor 32 could remove such routing information from the message text before submitting the SQL command to the SQL request processor 36. After completing the above described pre-processing, at step 210 the email processor 32 submits the SQL command to the SQL request processor 36.

The SQL request processor 36 is ultimately responsible for determining whether a submitted command is valid. The operations for checking the validity of a request could include determining whether the identified user account with which the email message is associated is authorized to submit the SQL command. In addition, the request must be syntactically correct and must refer correctly to objects (such as tables) that exist in the database associated with the SQL request processor 36. At step 212, if the email message is a valid request, then control passes to step 214.

It is noted that the email SQL requests typically contain embedded SQL query commands, and the results returned by the SQL request processor comprise the results of a database query. However, it is envisioned that the email requests will also include database insertion commands for adding a record (attached to the email message) to an identified database, or commands to delete or update existing records. The benefits of such an expansion of the functionality of an email-based interface for a database server include the ability to utilize customized email forms built with generally available email form software tools to submit database record information in an easy to parse, standardized format. Furthermore, customized tasks are easily added to the list of tasks invoked by the scheduler 34. Therefore, the email interface provides a unified interface for not only submitting and receiving queries, but also for building and updating the records of the database maintained by the SQL server 22.

At step 214, the email processor 32 formats the command results returned by the SQL request processor into the appropriate form for the recipients of the email response (as specified by the parameters which accompanied the email request). An example of such a parameter, discussed above, is a directive for the email processor 32 to format the result set of an SQL query as an attached spreadsheet file.

Returning briefly to step 212, if a request in an email message is not valid, then control passes to step 218. At step 218, the email processor 32 formats an error message returned by the SQL request processor 36 to be appended to a response email message. Control then passes to step 216.

At step 216, the email response builder 44 generates a response email message to be issued to the originator of the corresponding email SQL request. The response email message designates the primary receiver of the email response (the originator of the request) as well as any other "copied" email accounts originally designated in the "cc:" field. In an embodiment of the invention that implements security mechanisms, the SQL server 22 could check each account specified for receiving the results of the SQL request to determine whether the account is an authorized recipient of the SQL response embedded within the email response. The response email message also includes the results (formatted during step 214) of the executed SQL command.

Next, at step 220, the email processor 32 writes the response email message and any necessary header information to the mail "outbox" of the SQL server 22. Control then returns to step 202 wherein the email processor again traverses the mail "inbox" of the SQL server 22 for another received email message meeting the task's filtering characteristics.

As mentioned above, the concepts and teachings of the present invention extend well beyond processing database queries. That is, it may also be desired to utilize the present invention for executing commands to add, update or delete a record from the database. To illustrate this point, consider a database storing a list of customers on a particular mailing list, for example. A particular user (e.g., employee of catalog company) may, at a remote terminal, input user information that is to be added to the database. Rather than requiring the user to establish an on-line connection to the database in real time, the present invention may be utilized to allow the user to submit the information via an electronic mail system. In this regard, the user submits a command to the database server to add certain information (i.e., customer information). The database server, upon receiving this message from the electronic mail system, executes the command by adding the information to the database. If appropriate, a response confirming the addition of the information to the database may be returned to the user via email. While the foregoing provides one alternative example of a contemplated use for the present invention, it will be appreciated that numerous other uses may be achieved.

The above description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for executing, by a networked database server in a distributed processing environment that includes an email system, an email received request submitted by a client in the form of an email message to an electronic mailbox associated with the networked database server for storing the email message from the client, the method comprising the steps of:

retrieving, by an electronic mail interface within the networked database server and separate from the email system of the distributed processing environment, the email message from the electronic mailbox;

applying, by a scheduler within the networked database server and separate from the email system of the distributed processing environment, scheduling rules to the email message; and if the email message satisfies the scheduling rules, (1) extracting, by an electronic mail processor within the networked database server and separate from the email system of the distributed processing environment, the email received request from the email message; and (2) executing, by a request processor within the networked database server and separate from the email system of the distributed processing environment, the email received request.

2. The method of claim 1 further comprising the step of:

formulating an electronic mail response addressed to the client based upon a response issued by the request processor corresponding to the request.

3. The method of claim 2 further comprising the step of:

issuing the electronic mail response to an electronic mailbox associated with the client.

4. The method of claim 3 further comprising:

storing email a set of messages retrieved by the electronic mail interface from the electronic mailbox within a mail inbox;

identifying a first message within the set of messages meeting a filter for selectively executing retrieved email messages; and processing, by the electronic mail processor, the first message in accordance with the identifying step.

5. The method of claim 4 wherein the filter includes a format code for instructing the request processor to submit the results of an executed request in a specified format.

6. The method of claim 1 wherein the executing step comprises executing an operation associated with a database in accordance with the request.

7. The method of claim 6 wherein the request submitted by the client is a database query.

8. The method of claim 7 wherein the database query is a Structured Query Language (SQL) query.

9. The method of claim 6 wherein the request submitted by the client comprises a request to modify information associated with the database.

10. The method of claim 9 wherein the request to modify information comprises a command to add information to the database.

11. The method of claim 9 wherein the request to modify information comprises a command to delete information from the database.

12. The method of claim 6 wherein the database operates independently from an email system.

\* \* \* \* \*

UNITED STATES PATENT AND TRADEMARK OFFICE
CERTIFICATE OF CORRECTION

PATENT NO. : 6,230,156 B1
DATED : May 8, 2001
INVENTOR(S) : Peter Hussey

It is certified that error appears in the above-identified patent and that said Letters Patent is hereby corrected as shown below:

Column 4,
Line 61, "as well by" should read -- as well as by --.

Column 5,
Line 10, "20 The" should read -- 20. The --.

Column 8,
Line 11, "tire" should read -- time --.

Column 9,
Line 35, "Server 22" should read -- server 22 --.
Line 45, "embodiment: of" should read -- embodiment of --.

Column 13,
Line 26, "claim 3" should read -- claim 1 --.

Signed and Sealed this

Twenty-third Day of September, 2003

JAMES E. ROGAN
*Director of the United States Patent and Trademark Office*